(12) United States Patent
Stuck et al.

(10) Patent No.: US 12,479,198 B2
(45) Date of Patent: Nov. 25, 2025

(54) BENDABLE LAMINATED FIBERBOARD

(71) Applicant: Fibre Converters, Inc., Constantine, MI (US)

(72) Inventors: James D. Stuck, Constantine, MI (US); Nate L. Wolverton, Constantine, MI (US); Eric M. Ferguson, Constantine, MI (US)

(73) Assignee: Fibre Converters, Inc., Constantine, MI (US)

( * ) Notice: Subject to any disclaimer, the term of this patent is extended or adjusted under 35 U.S.C. 154(b) by 591 days.

(21) Appl. No.: 17/192,099

(22) Filed: Mar. 16, 2021

(65) Prior Publication Data

US 2022/0297415 A1   Sep. 22, 2022

(51) Int. Cl.

| | | |
|---|---|---|
| *B32B 33/00* | (2006.01) | |
| *B32B 3/30* | (2006.01) | |
| *B32B 27/30* | (2006.01) | |
| *B32B 27/36* | (2006.01) | |
| *B32B 43/00* | (2006.01) | |

(52) U.S. Cl.
CPC .............. *B32B 33/00* (2013.01); *B32B 3/30* (2013.01); *B32B 27/304* (2013.01); *B32B 27/36* (2013.01); *B32B 43/003* (2013.01); *B32B 2250/244* (2013.01); *B32B 2307/51* (2013.01)

(58) Field of Classification Search
CPC .. B32B 33/00; B32B 3/30; B32B 3/26; B32B 3/263; B32B 3/28
USPC ............... 428/130, 163, 167, 182, 183, 138
See application file for complete search history.

(56) References Cited

U.S. PATENT DOCUMENTS

| | | | |
|---|---|---|---|
| 1,508,709 A | 9/1924 | Nasmith | |
| 1,750,718 A | 3/1930 | Lenston | |
| 2,242,514 A | 5/1941 | De Smith | |
| 2,576,698 A * | 11/1951 | Russum | ............... F01B 17/04 52/249 |
| 3,867,238 A | 2/1975 | Johannsen | |
| 5,232,762 A | 8/1993 | Ruby | |
| 5,310,594 A | 5/1994 | Holland et al. | |
| 6,457,237 B1 | 10/2002 | Matthews et al. | |
| 2009/0113838 A1 * | 5/2009 | Paulsen | ................ B32B 21/08 52/653.1 |
| 2017/0305101 A1 | 10/2017 | Greenfield | |
| 2019/0390870 A1 | 12/2019 | Fellinger et al. | |

FOREIGN PATENT DOCUMENTS

| | | | | |
|---|---|---|---|---|
| DE | 202008004011 U1 * | 7/2008 | .......... | A47B 96/202 |
| JP | 1991JP0214083 | 8/1991 | | |
| WO | WO0112395 A1 | 2/2001 | | |

OTHER PUBLICATIONS

Certified English Translation of DE202008004011U1 (Year: 2008).*

* cited by examiner

*Primary Examiner* — Alicia J Weydemeyer

(74) *Attorney, Agent, or Firm* — Gunther J. Evanina; Butzel Long

(57) ABSTRACT

A bendable fiberboard panel having a plurality of spaced apart parallel grooves extending partially through the thickness of the panel is prepared using a rotatory tool having a generally circular disc shape with a smooth peripheral edge having a double-double beveled profile. The resulting bendable panel is characterized by having a substantially uniform continuously curved transverse cross-sectional profile and superior strength as compared with traditional cut-scored or crease-scored panels.

5 Claims, 3 Drawing Sheets

BENDABLE LAMINATED FIBERBOARD

FIELD OF THE DISCLOSURE

The subject matter disclosed herein relates generally to laminated fiberboard that has been tooled to facilitate bending of the fiberboard, a method for producing such bendable laminated fiberboard, and a tool for performing the method.

BACKGROUND OF THE DISCLOSURE

There is a need for bendable sheets made from cellulosic materials. Such sheets are frequently used for packaging. For example, cardboard boxes are typically shipped flat, and include score lines or crease lines that facilitate folding of the sheets into a completed box for shipment of goods. However, there is also a need for more durable and/or protective bendable sheet materials, such as for heavier goods or more delicate or fragile goods. In such case, bendable fiberboard can be employed.

There is also a need for bendable sheet materials that are more durable and/or more protective than cardboard packaging, and which also include a functional and/or ornamental layer (e.g., printed layer, moisture barrier layer, etc.) laminated to the fiberboard. Conventional methods of preparing bendable laminated fiberboards include the use of kerf cuts, creasing or scoring.

Kerf cutting includes cutting a plurality of spaced apart parallel grooves or troughs partially through the thickness of the sheet material. Kerf cuts have been advantageously employed in the production of furniture having curved sheet structures by filling any gaps between the kerf cuts with a resin during fabrication, and shipping the item in a curved condition, rather than flat. In the case of packaging materials comprising bendable laminated fiberboard shipped flat, it is impractical to employ adhesives. Rather, it is desirable that such sheet materials can be bent into various shapes such as the shape of a box-like packaging structure without the use of adhesives that would require an impractically long assembly time. However, kerf cut fiberboard that is folded without adhesives tend to lack sufficient strength at the bent portions of the assembled package (i.e., kerf cutting compromises the tensile and compressive strength of the bent board).

Conventional creasing or scoring techniques work well for producing bendable cardboard sheets. However, creasing or scoring tend to induce delamination and/or cracking of the functional and/or ornamental layer of a laminated fiberboard.

SUMMARY OF THE DISCLOSURE

A bendable fiberboard panel having improved strength as compared with kerf cut bendable fiberboard panels, and reduced cracking and delamination of a functional and/or ornamental layer or layers as compared with creased or scored bendable fiberboard panels is achieved using a double-double beveled rotatory tool. The tool has a smooth peripheral tooling edge having a double-double bevel, including a first symmetrical double bevel (near the tool edge) having an angle of from 95 degrees to 135 degrees and a second symmetrical double bevel (radially inward from the edge and adjacent the first double bevel) having an angle of from about 30 degrees to about 40 degrees.

The improved bendable fiberboard is made using an apparatus employing a plurality of the aforementioned double-double beveled tools. More specifically, from about 7 to about 15 of the rotatory double-double beveled tools can be mounted on an axle of a tool assembly, with the axle mounted for rotation along an axis transverse to a machine direction of a fiberboard that is to be machined to form bendable joints.

The method of making the improved bendable fiberboard involves providing a tool assembly comprising from about 7 to about 15 of the rotatory double-double beveled tools mounted on an axle, rotating the axle as a fiberboard is moved in a direction transverse to the rotational axis of the tools, with the peripheral tooling edge of the tools positioned partially into the thickness of the fiberboard.

The tools and methods of this disclosure produce an improved bendable fiberboard panel without cutting out as much material as is typically removed using a saw-toothed cutting tool, and without excessive deformation of material opposite the tooled side of the fiberboard, such that delamination and/or cracking of a functional layer and/or aesthetic layer or layers is avoided or substantially reduced. The resulting bendable fiberboard panel is characterized by having a plurality of uniformly spaced apart grooves and ridges extending between the grooves, each ridge having a substantially uniform continuously curved transverse cross-sectional profile. It has also been determined that the disclosed process for creating a bendable fiberboard produces products that can be more easily bent (i.e., less force is required) than products made using other techniques, such as kerf cutting, scoring and creasing.

DETAILED DESCRIPTION

Figure 1:
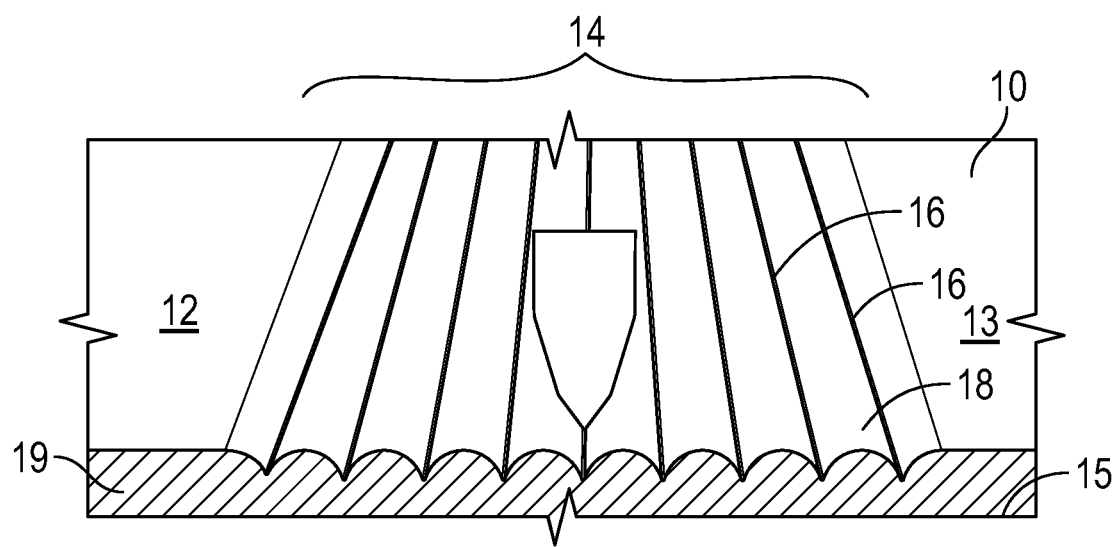
FIG. 1 is a perspective view of a bendable laminated fiberboard in accordance with the disclosure.

Shown in FIG. 1 is a bendable laminated fiberboard panel 10 in a flat configuration (i.e., non-bendable sections 12, 13 and bendable section 14 of the laminated fiberboard 10 are all aligned in substantially the same plane). Bendable section 14 is comprised of a plurality of parallel grooves 16 (nine grooves in the illustrated example). Between each pair of immediately adjacent parallel grooves is a ridge 18 that is continuously curved and smooth between the adjacent grooves. This is believed to be a substantially different shape than kerf cut boards, which typically have approximately a square wave profile in the bendable section. It is also believed to be considerably different from conventional creased or scored material profiles.

Figure 2:
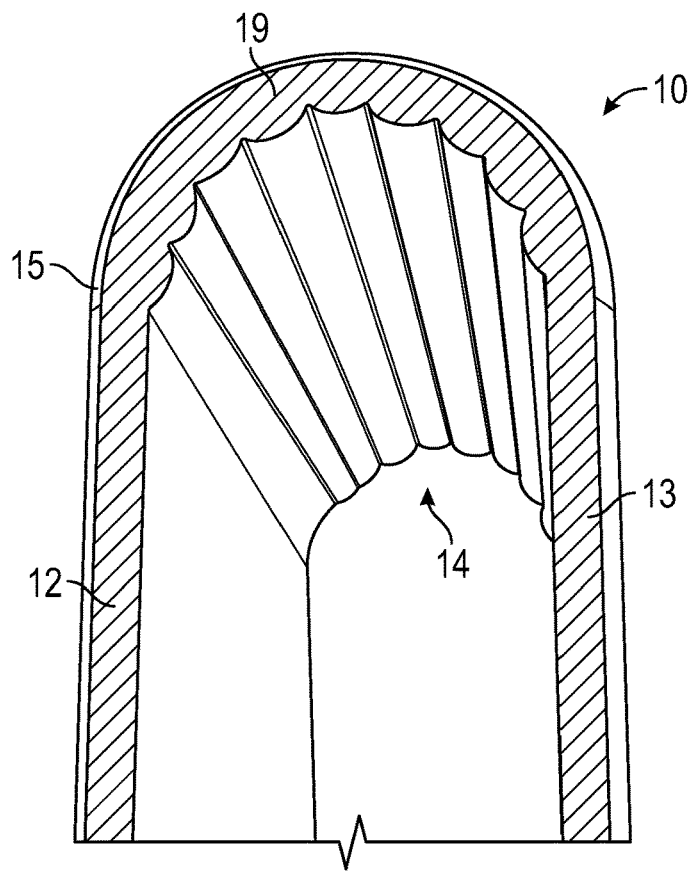
FIG. 2 is a perspective view of the laminated fiberboard after being bent 180 degrees.

FIG. 2 shows the panel 10 folded in the bendable section 14 by an angle of 180 degrees so that the non-bendable sections 12 and 13 are approximately parallel. In practice, the bendable area can be provided with an appropriate number of grooves 16 to facilitate bending at essentially any angle, including 360 degrees to form a tubular structure from panel 10. Laminated to the fiberboard 19 is at least one functional layer 15. Functional layer 15 can be a thermoplastic barrier layer (e.g., moisture or oxygen barrier) or a print receptive layer. Multiple layers can be laminated to the fiberboard. An example of a preferred barrier layer is a polyolefin film layer, such as a polyethylene film layer (e.g., HDPE).

Figure 3:
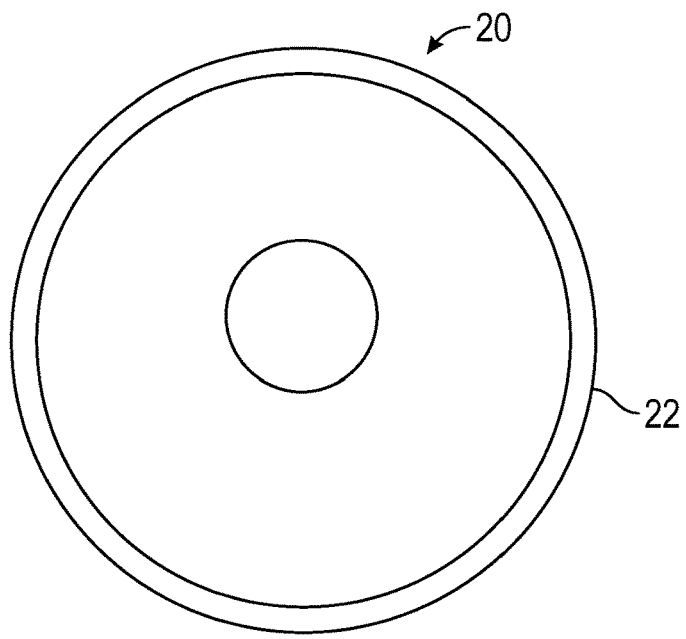
FIG. 3 is a perspective view of a circular tool in accordance with the disclosure.
Figure 4:
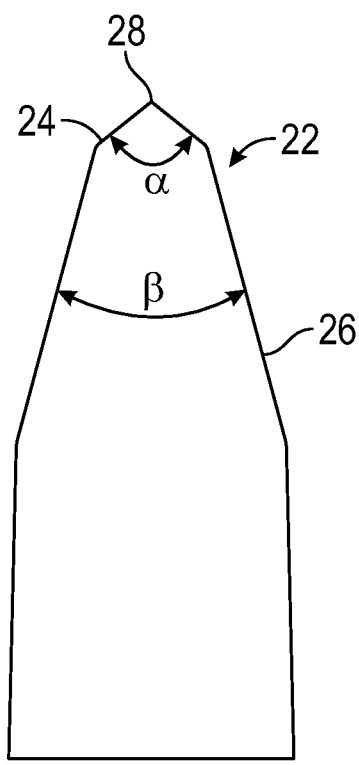
FIG. 4 is a transverse fragmenting view of the tool shown in FIG. 3 illustrating the tooling edge of the tool.

Shown in FIG. 3 is a circular tool 20, somewhat similar to a circular saw blade. However, tool 20 preferably has a smooth peripheral tooling edge 22 (i.e., does not include teeth that would tear material). The tooling edge 22 is shown in profile in FIG. 4 (i.e., along a cross-section perpendicular to the major plane of the disc-shaped tools). The edge has a double-double bevel, including a first symmetrical taper 24 having (near the tool edge 22) an angle α of from 95 degrees to 135 degrees, and a second symmetrical taper 26 (adjacent to the first symmetrical taper radially inward from the edge) having an angle β of from about 30 degrees to about 40 degrees. It has been discovered that the prescribed double-double bevel in combination with a smooth peripheral edge form grooves 16 wherein fiberboard material is compressed at or below the groove (i.e., between the groove and the laminated layer 15) without removing a substantial amount of fiberboard material. This facilitates bendability without significantly compromising strength. It has also been discovered that use of the described tool reduces transmission of forces (stresses) through the fiberboard and to the laminated layer, thereby reducing or eliminating delamination and/or cracking of the laminated layer.

The tip 28 of edge 22 is relatively pointed and has a relatively small radius of curvature of from zero to about 0.015 inch.

Figure 5:
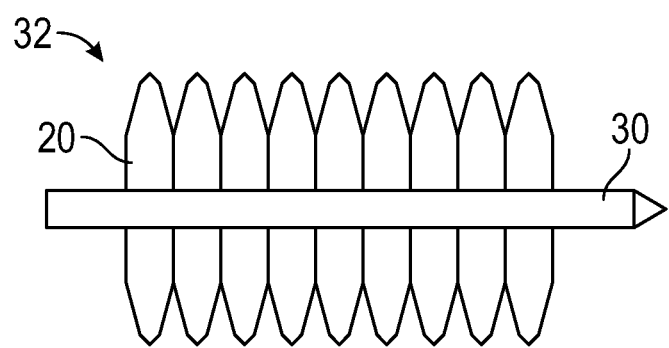
FIG. 5 is an elevational view of a tool assembly including a plurality of circular tools mounted on an axle.

Shown in FIG. 5 is a tool assembly 32 used for producing a bendable panel 10. Assembly 32 includes an axle 30 (i.e., shaft that is mountable for rotation) having a plurality of tools 20 attached thereto (nine in the illustrated embodiment). The number of tools 20 used will depend on the amount of bending required, and may also depend on the thickness and/or density of the fiberboard. In general, the number of tools 20 used to create a bendable section will be from about 5 to 20, more typically about 7 to 15, and even more typically 8 to 12.

The method of making a bendable laminated fiberboard 10 using the tools 20 described herein involves either moving the material under the tool assembly or passing the tool assembly 32 over panel 10, with the axle rotating at high speed (e.g., 4000-5000 rpm), and with the tool edge impinging on and compressing the fiberboard (from the side opposite the laminated layer) to a depth of from about ¼ to ¾ the thickness of the fiberboard 19, preferably from about ⅜ to ⅝ of the thickness of the fiberboard.

The resulting bendable board has a series of spaced apart grooves, bridged by ridges having a smooth continuously curved shape in profile, with the contour of the ridge typically being approximately semi-circular.

The methods, tools and panels of the disclosure improve ease of bending while protecting laminated layers against damage such as cracking and delamination.

While both fiberboard and particle board are made of cellulose materials bonded together with a synthetic adhesive, fiberboard is distinguished from particle board primarily based on the type of cellulose material used. Particle board is made of small pieces of wood, wood shavings, and wood dust, whereas fiberboard is fabricated using cellulose materials that have been processed to provide individual fibers that are bonded together with a resin binder.

Bendable fiberboard is used, for example, for protective packaging of products that cannot be adequately protected in cardboard packaging. The bendability allows the packaging to be shipped flat and folded into the desired box-like structure immediately prior to use. Bendable also means that the fiberboard can be folded so that adjacent flat (non-unbendable) portions are oriented at an angle without cracking or delamination of the layer or layers laminated to the fiberboard.

Laminated fiberboard refers to a sheet material having a fiberboard substrate onto which at least one additional functional and/or decorative layer is bound with an adhesive resin. For example, a laminated fiberboard could comprise a fiberboard substrate onto which a moisture barrier layer comprising a thermoplastic film such as a polyethylene film (e.g., LDPE or HDPE), PET film or PVC film is adhered.

The parallel grooves used to impart bendability are desirably uniformly spaced apart and uniformly sized. It is expected that a suitable result can be achieved for most applications when the bendable section of the bendable laminated fiberboard comprises from 7 to 15 individual grooves separated (centerline to centerline) by from about 0.025 inches to about 0.275 inches.

The tools and methods described herein provide a bendable fiberboard having a plurality of parallel grooves forming ridges between adjacent grooves (i.e., the deepest portion of the score or cut). The ridges have a continuously curved transverse cross-section desirably with a constant radius (i.e., a circular section that is desirably approximately semi-circular).

The preferred tool for creating the parallel spaced apart grooves is a rotatable circular disc having a peripheral edge that is designed to create a hybrid groove that is not purely a cut and not purely a score, but instead has advantageous attributes of both, while minimizing disadvantages of both. The peripheral edge is preferably smooth, i.e., the edge does not have teeth or barbs.

The improved features of the bendable laminated fiberboards described herein are preferably achieved using a tool having a peripheral edge having a cross-sectional double-double bevel. This means that the peripheral edge of the tool, when viewed along a cross-section perpendicular to the disc plane, has a first taper on opposite sides of the edge of the disc and a second taper extending from the first taper to the tip of the disc edge.

It is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In summary, it should be understood that the invention is capable of modification and variation.

What is claimed is:

1. A bendable panel, comprising:
   a fiberboard having a bendable section between non-bendable sections, the bendable section having a plurality of spaced apart parallel grooves that extend partially through a thickness of the fiberboard, and having a plurality of ridges, each ridge being between adjacent grooves, wherein each ridge has a substantially uniform continuously curved transverse cross-sectional profile between the adjacent grooves.

2. The bendable panel of claim 1, wherein a layer of sheet material is laminated to the fiberboard.

3. The bendable panel of claim 2, wherein the sheet material is a thermoplastic film.

4. The bendable panel of claim 3, wherein the thermoplastic film is a film selected from polyethylene film, polyethylene terephthalate film, and polyvinyl chloride film.

5. The bendable panel of claim 1, wherein the substantially uniform continuously curved ridges have a transverse cross-sectional profile that is semi-circular.

* * * * *